United States Patent [19]

Gissinger et al.

[11] Patent Number: 5,522,270
[45] Date of Patent: Jun. 4, 1996

[54] DEVICE FOR THE MEASUREMENT OF STRESSES EXERTED ON A MECHANICAL PART, AND METHOD TO FASTEN SAID DEVICE

[75] Inventors: Gérard Gissinger, Balschwiller; Jean-Marc Perronne, Montbeliard; Marc Renner, Mulhouse, all of France

[73] Assignees: Thomson-CSF, Paris; Universite De Haute Alsace, Mulhouse, both of France

[21] Appl. No.: 189,732

[22] Filed: Feb. 1, 1994

[30] Foreign Application Priority Data

Feb. 9, 1993 [FR] France ................................. 93 01408

[51] Int. Cl.⁶ ................................................... G01L 1/04
[52] U.S. Cl. .................................. 73/862.627; 73/775
[58] Field of Search ...................... 73/862.632, 862.627, 73/763, 774, 775, 776; 338/2, 5; 29/621.1

[56] References Cited

U.S. PATENT DOCUMENTS

| | | | |
|---|---|---|---|
| 3,411,348 | 11/1968 | Schultheis, Jr. ................ | 73/775 X |
| 3,828,606 | 8/1974 | Wolter ........................... | 73/774 X |
| 3,943,758 | 3/1976 | Wolf et al. ..................... | 73/775 X |
| 4,299,130 | 11/1981 | Koneval ......................... | 73/862.632 X |
| 4,343,197 | 8/1982 | Suzuki et al. . | |
| 4,522,067 | 6/1985 | Burger et al. ................. | 73/862.632 X |
| 4,553,872 | 11/1985 | Chandra et al. ............... | 73/855 X |
| 4,557,150 | 12/1985 | Utsunomiya ................... | 73/862.627 |
| 4,633,721 | 1/1987 | Nishiyama ..................... | 73/776 X |
| 4,793,189 | 12/1988 | Dell'Orto et al. ............. | 73/775 |
| 5,079,535 | 1/1992 | Neuman et al. ............... | 73/862.627 X |
| 5,193,402 | 3/1993 | Reed ............................. | 73/862.627 X |
| 5,199,518 | 4/1993 | Woodle ......................... | 73/862.627 X |
| 5,289,722 | 3/1994 | Walker et al. ................. | 73/775 |

FOREIGN PATENT DOCUMENTS 3504872  8/1986  Germany .

Primary Examiner—Richard Chilcot
Assistant Examiner—Elizabeth L. Dougherty
Attorney, Agent, or Firm—Oblon, Spivak, McClelland, Maier & Neustadt

[57] ABSTRACT

Disclosed are a device for the measurement of stresses exerted on a mechanical part and a method for the fastening of this device. The device comprises at least one plate and one strain gauge, the gauge being fixed to the plate which is connected to the mechanical part by linking and coupling means, the strain gauge generating an electrical signal representing the stresses exerted. Application to the measurement of stresses exerted on all types of mechanical parts, notably on brake calipers.

16 Claims, 5 Drawing Sheets

DEVICE FOR THE MEASUREMENT OF STRESSES EXERTED ON A MECHANICAL PART, AND METHOD TO FASTEN SAID DEVICE

BACKGROUND OF THE INVENTION

The present invention relates to a method for the measurement of stresses exerted on a mechanical part and a method for the secure fastening of this device. It can be applied notably to the measurement of the stresses exerted on or the strains undergone by mechanical parts such as brake jaws or brake calipers, or traction elements for example. More generally, it can be applied to the measurement of stresses exerted by all types of mechanical parts, whatever their function, the invention being applicable also to heavy and bulky parts that are difficult to handle or are designed to be mass-produced for example.

The performance characteristics of on-line control systems, maintenance or the regulation of mechanical systems such as braking or traction systems would be notably improved by the measurement of the stresses exerted on certain of the principal mechanical parts subjected to forces, such as a brake jaw or brake caliper in a braking system for example. Indeed, knowledge of the strains makes it easy to trace them back to the state in which the system has been subjected to action: for example, a knowledge of the stresses exerted on the above-mentioned brake jaw or brake caliper provides for knowledge of the braking torque that is actually exerted on this jaw or caliper independently, in particular, of the slippages or strains in the wheels. In the latter case, proper knowledge of the braking torque notably improves the performance characteristics of the servocontrol of the braking system.

Numerous other applications also require a reliable measurement of the strains in mechanical parts constituting a given system, whether this system is dynamic (for example rotating) or static as in the case of a mechanical holding device or mechanical reinforcement device for example.

These mechanical strains are caused by stresses that get exerted on the parts. Since the strains are related to the stresses through the laws of the mechanics of materials, references to the "measurement of stress" and to the "measurement of strain" amount to one and the same thing. Hereinafter in the text, these two terms shall be used without distinction. These stresses are due, for example, to the application of stretching, compressive, bending, twisting or shear forces.

It is difficult to securely fasten existing stress sensors to the parts to be checked because they generally require a large number of fastening points. Furthermore, the electrical signals given by the strain gauges that constitute these sensors are generally of a very low level whereas the circuits for shaping these signals are at a distance from these gauges. This distance dictates the circulation of signals of a very low level on non-negligible lengths of cables, subjecting these signals to great risks of disturbance. These sensors are therefore set up only for very specific applications, owing notably to their cost and to the difficulty of implementation.

To overcome these problems, one approach may consist, for example, in making measurements of stress by strain gauges that are directly bonded to the parts to be checked. However, implementing such a solution is a delicate task and its automation is difficult, notably because of certain geometries of parts. Furthermore, the adhesive or bonder must faithfully transmit the stresses exerted on the parts to the gauges. Now, since the surface of these parts is not always perfectly plane, there is a risk that this faithful transmission of the stresses as well as the secure fastening of the gauge will not always be ensured. Furthermore, the problem of the distance of the signal-shaping circuits remains. These circuits amplify the signals that they receive from the strain gauges and deliver the results of the stress measurements in analog or digital form for example.

The aim of the invention is to overcome the above mentioned drawbacks, notably by facilitating the fastening, to mechanical parts to be checked, of means for the measurement of the stresses undergone by these parts.

SUMMARY OF THE INVENTION

To this end, an object of the invention is a device for the measurement of stresses exerted on a mechanical part, wherein said device comprises at least one plate and one strain gauge, the gauge being fastened to the plate, which is connected to the mechanical part by linking and coupling means, the strain gauge generating an electrical signal representing the stresses exerted.

An object of the invention is also a method for the fastening of the above-mentioned device to mechanical parts.

The main advantages of the invention are that it enables the circuits for the shaping of the signals delivered by the strain gauges to be positioned in the vicinity of these gauges, that it can be adapted to every type of mechanical part, that it enables automatic mounting of the measurement means, notably in large batches, and that it is compact and economical.

BRIEF DESCRIPTION OF THE DRAWINGS

Other characteristics and advantages of the invention shall appear from the following description, made with reference to the appended drawings, of which.

DETAILED DESCRIPTION OF THE PREFERRED EMBODIMENTS

Figure 1:
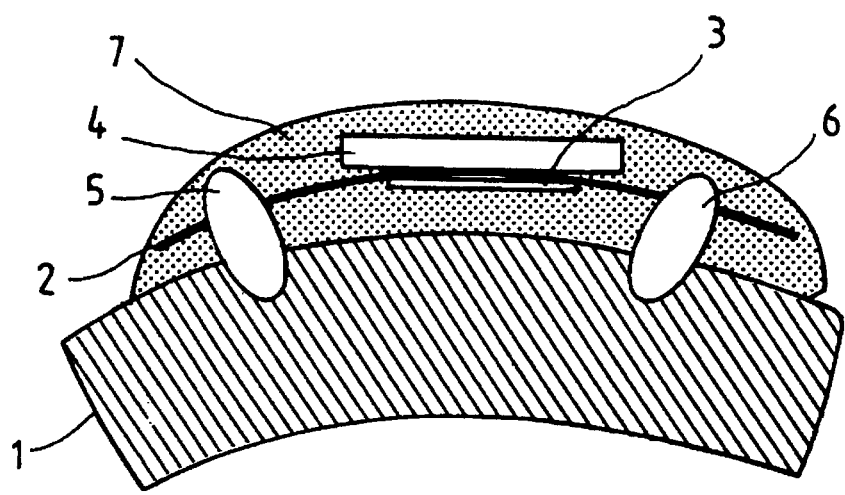
FIGS. 1 and 2 are diagrams showing the principle of a device according to the invention.

FIG. 1 is a diagram showing the principle of a possible embodiment of a device according to the invention, to measure stresses exerted on a mechanical part 1. This part may be, for example, a brake caliper or any other mechanical element. The device according to the invention comprises at least one plate 2 and one strain gauge 3 capable of generating an electrical signal as a function of the strain to be measured, this gauge being securely fastened to the plate 2, in being bonded for example. Advantageously, means 4 for the shaping of the electrical signal generated by the strain gauge 3 may be fastened to the plate 2, hence in the vicinity of the gauge. This fact of bringing the means 4 closer to the gauge 3 notably prevents this signal, which is a signal with a very low level, from being disturbed all along the linking wires. In a manner known to those skilled in the art, the strain gauge may be, for example, a resistive element of a Wheatstone bridge, the slightest strain undergone by the gauge modifying its resistance and hence the signal at output of the bridge. The plate 2 is connected to the mechanical part 1 by linking and coupling means 5, 6. The linking of the plate 2 to the part 1 is ensured by rigid elements such as screws, pins, tongues or studs for example. Coupling elements, for their part, enable the strains of the mechanical part 1 to be transmitted integrally to the plate 2. To this end, they are constituted for example by a material in which the strain is negligible as compared with that of the plate itself. These coupling elements may be a bonder or adhesive agent with one or more constituents, solders or any other means for making an embedded type of link for example.

As an option, the stress measurement device according to the invention may be covered with a protection coating 7. This coating protects the device notably against environment conditions, namely against humidity, temperature or acid mist for example.

FIG. 1 illustrates an exemplary application of a measurement device according to the invention, where the strain of the mechanical part to be measured is a simple stretching strain or a simple compressive strain. In this case, two linking points suffice to connect the plate 2 and the mechanical part 1.

Figure 2:
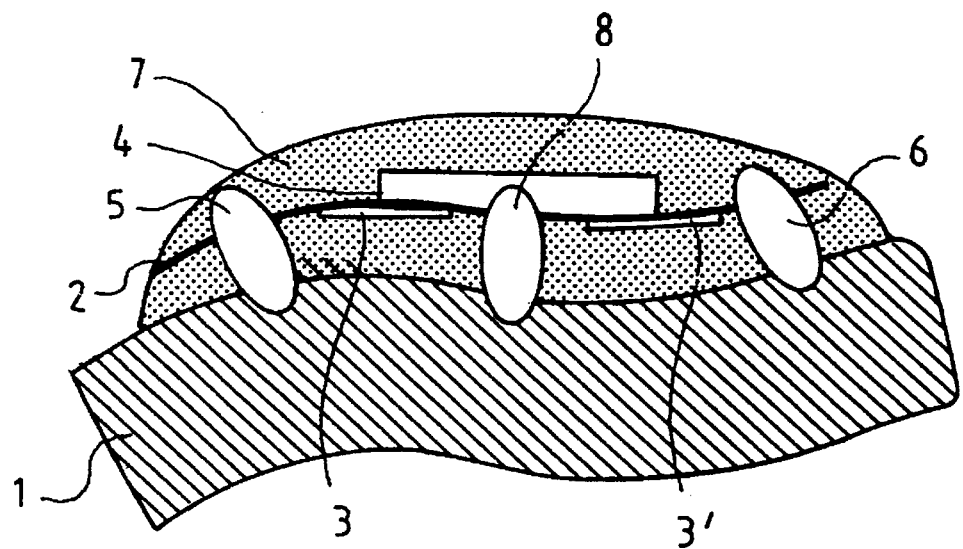

FIG. 2 shows a schematic drawing of another possible embodiment of a device according to the invention in a case of application, notably where the mechanical part 1 to be checked undergoes two opposite types of strain side by side, these strains being, for example, a stretching strain and a compressive strain. To assess these strains, a second strain gauge 3' is laid on the plate 2, the first gauge 3 being designed for a first type of stress and the second gauge 3' being designed for a second type of stress. In this case of application, two linking points would make it possible to measure only a compensation for the strains. To circumvent this phenomenon and to obtain a measurement of each of the strains, a third linking point that receives linking and coupling means 8 is needed.

Depending on the number and types of stresses exerted on the mechanical part 1, other strain gauges and other linking points may be added, for example as many linking points as there are stresses and as many strain gauges as there are stresses.

The flexibility with which the measuring device according to the invention can be laid makes it easy to modify its position on a mechanical part to be checked. This position must be located preferably right at the position of the strains. These strains range from some micrometers per meter to some hundreds of micrometers per meter. The positioning of the plate 2 is advantageously derived from a prior analysis of the stresses exerted on the part. This analysis may be carried out, for example, by a finite element method.

According to the invention, the plate 2 shows high sensitivity to strains. It may be constituted, for example, by a fine plate of steel. It may be equipped, for example, with a complete bridge comprising at least one strain gauge supplied with a DC voltage. A strain in the mechanical part to be checked modifies the resistance of at least one of the gauges and therefore modifies the output voltage of the bridge. A calibration may be carried out, for example, to measure the strains.

The means 4 for shaping the electrical signal generated by a strain gauge 3 comprise, for example, circuits for the amplification and filtering of the received signal. With circuits known to those skilled in the art, the shaping means may deliver, for example, an information element having the form of a voltage signal, a current signal, a digitized signal or a frequency signal. In the last-named case, a frequency value constitutes the information on the measurement of the strains. This approach is notably advantageous when the stress-measuring device according to the invention is set up in a rotating device. Indeed, in this case, the frequency signal may be transmitted, for example, to an information-processing device or control device located on a part fixed by means of a transformer, the primary circuit of this transformer being on the rotating part and its secondary circuit being on the fixed part, the two circuits, namely the primary circuit and the secondary circuit, being concentric.

Figure 3:
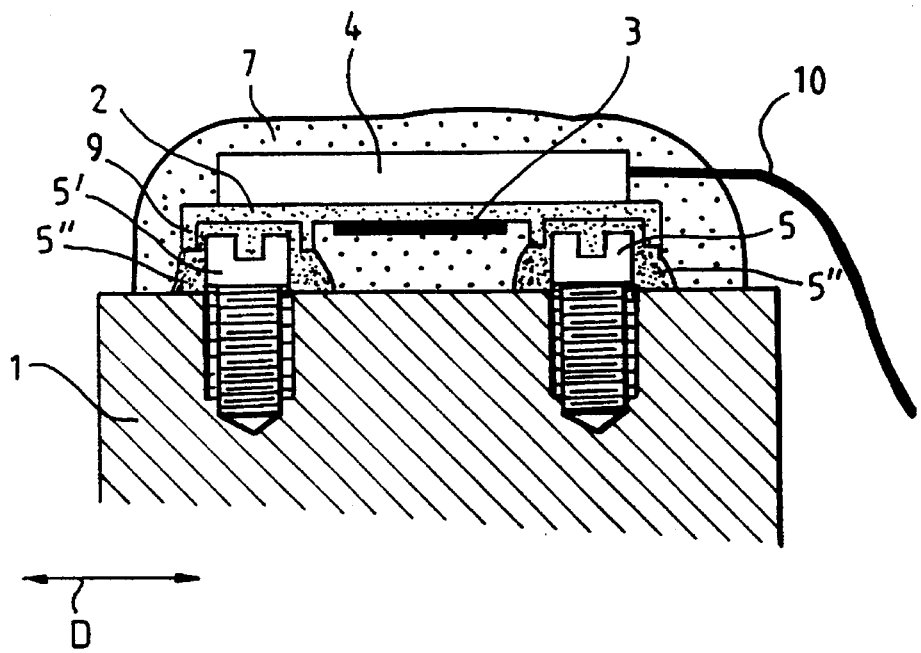
FIGS. 3 and 4 show possible embodiments of devices according to the invention.

FIG. 3 shows an exemplary view of a first possible embodiment of a device according to the invention. The linking and coupling means 5 are constituted by screws 5' to ensure the mechanical linking between the plate 2 and the mechanical part 1, and by adhesive or bonder 5" to ensure the mechanical coupling between the plate 2 and the mechanical part 1. The screws 5' being screwed into the mechanical part 1, the plate 2 is, for example, bonded to these screws by means of adhesive or bonder 5". The plate 2 is, for example, laid on the screws 5' by guides 9 designed for this purpose. The means 4 for the shaping of the electrical signals generated by the strain gauge 3 are connected for example at their output to a conductive link 10. This link 10 transmits the measuring information elements, in the form of analog, digital or frequency signals, to a reading, control or processing element for example.

For example, the exemplary application of stress measurement shown in FIG. 3 calls for two linking points corresponding notably to a simple stretching strain or compressive strain in a direction D.

Figure 4:
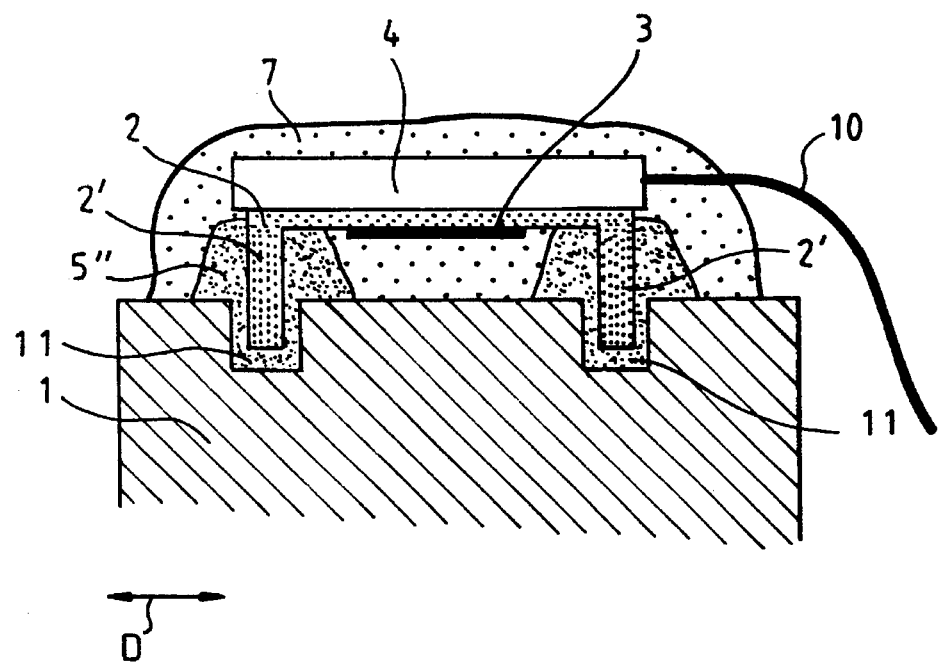

FIG. 4 shows a second possible embodiment of a stress measurement device according to the invention. Unlike in the foregoing example, the part 1 to be checked has grooves 11 and the plate 2 has walls 2' perpendicular to its base embedded in the grooves 11 to ensure the mechanical link between the plate 2 and the mechanical part 1. The mechanical coupling is obtained by means of an adhesive or bonder 5", the plate 2 being bonded at least at the level of the grooves 11. As in the case of the foregoing exemplary application, two linking points are needed to measure the strains in a direction D. The devices of FIGS. 3 and 4 may be covered with a protective coating 7 mentioned here above.

A thermistor may be connected to the strain gauges placed on the plate 2. Indeed, in the event of a rise in temperature notably, there is a modification of the gauge parameters that causes a drift in the signals generated. In this case, a corrective function may be memorized for example in the signal-shaping means 4, the correction of these signals as a function of the temperature being possibly done, for example, by a microprocessor at the time of the reading of the temperature and of the memorized function. This mode of correction may notably be installed in stress measurement devices according to the invention used, for example, to measure the braking forces of an automobile equipped with a disk brake.

Figure 5A:
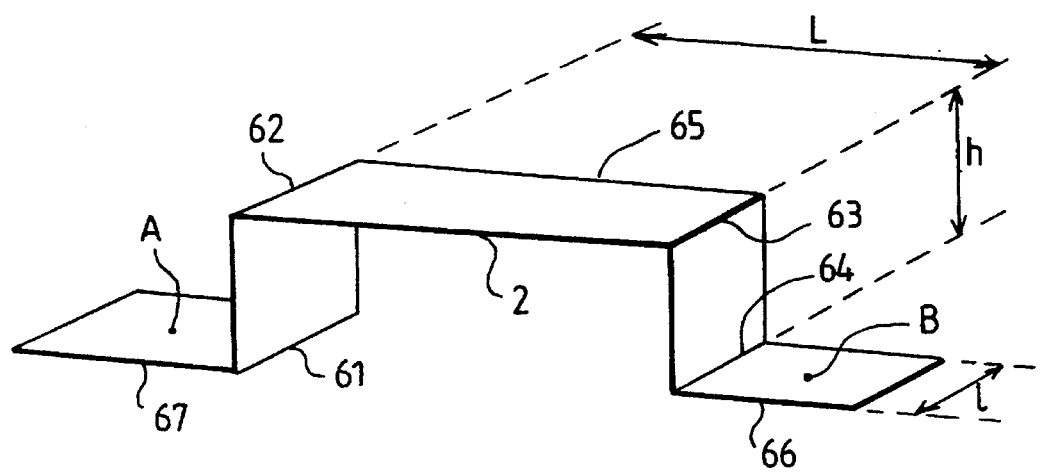
FIGS. 5a, 5b, 5c, 5d and 6 show a particular shape of a plate, which is an element of the device according to the invention, and examples of the prestressing applied to this plate when it is being laid.

FIG. 5a illustrates a particular possible shape of a plate 2 of a device according to the invention. This shape makes it possible notably to subject a flexible plate to a bending or deflection force by means of a prestressing applied when the plate is laid. This plate is constituted by a band of simple material with a width l and a given thickness e. This part, which is metallic for example, is folded into or assembled along four lines 61, 62, 63, 64 which may have a sharp ridge or a shoulder to form an upper part 65 with a LENGTH L, located at a height h from the lower parts 66, 67. These lower parts are, for example, anchored to the mechanical part 1 at fastening points A, B by screwing, riveting, bonding or by a combination of one or other of these means. These fastening points are at a given distance from the lower folding or assembling lines 61, 64.

Figure 5D:
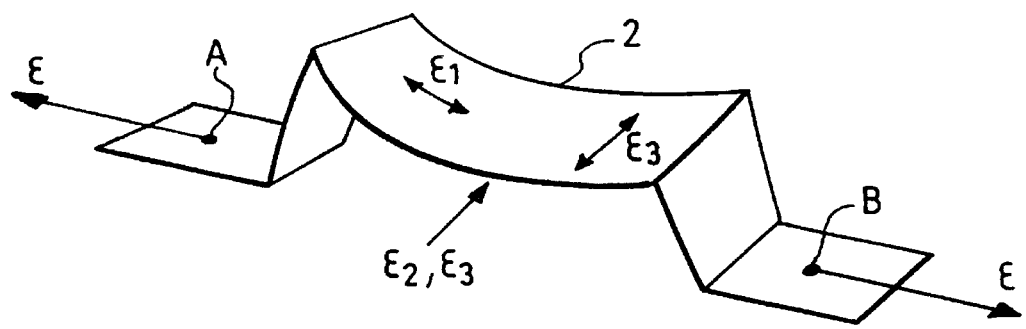
Figure 5B:
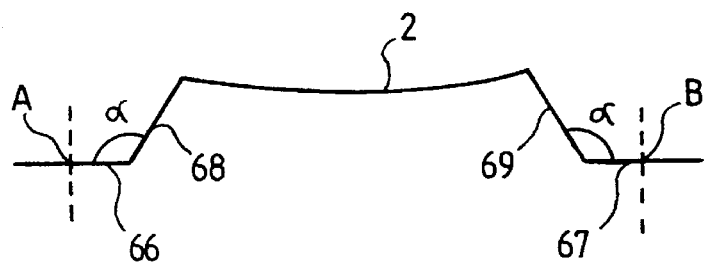
Figure 5C:
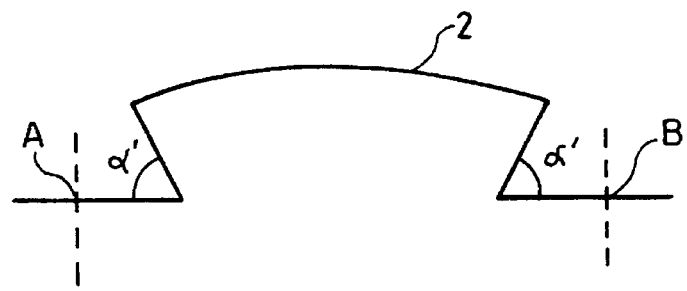

FIGS. 5b and 5c show that it is possible to apply an initial deflection force to the plate 2. For example two positioning stresses are illustrated.

The first positioning stress shown in FIG. 5b is applied during the fastening of a plate whose initial angle a is greater than 90°. The fact of folding down the lower parts 66 and 67 means that the fastening points A, B are made to come closer together than in the initial shape and dictates a concave deflection of the zone 65.

The second laying constraint shown in FIG. 5c is given during the fastening of a plate whose initial angle a is smaller than 90°. The fact of folding down the lower parts 66 and 67 means that the fastening points A, B are made to come closer together than in the initial shape and dictates a convex deflection of the zone 65.

Any stretching strain or compressive strain of the support of the plate 2, i.e. of the mechanical part 1, then results in a modification of the bending or deflection force applied to the plate and hence in the modification of the surface strains that are proportional to the stretching or to the compression. These surface strains may be read by means of strain gauges 3 of the same type, for example, as those described here above.

FIG. 5d illustrates a case where the mechanical part 1 supporting the plate 2, undergoes a stretching strain E, the prestress applied when the plate is laid then being then that of FIG. 5b. The plate 2 then undergoes modifications of its surface strains, namely an upper longitudinal strain $\epsilon_1$, a lower longitudinal strain $\epsilon_2$, an upper transversal strain $\epsilon_3$ and a lower transversal strain $\epsilon_4$. Depending on each case and as needed, these surface strains $\epsilon_1, \epsilon_2, \epsilon_3, \epsilon_4$ are not all measured. The choice of the above mentioned parameters, L, 1, a, e, h, $\alpha$ and $\alpha'$ condition the sensitivity of the plate to the stresses applied.

Figure 6:
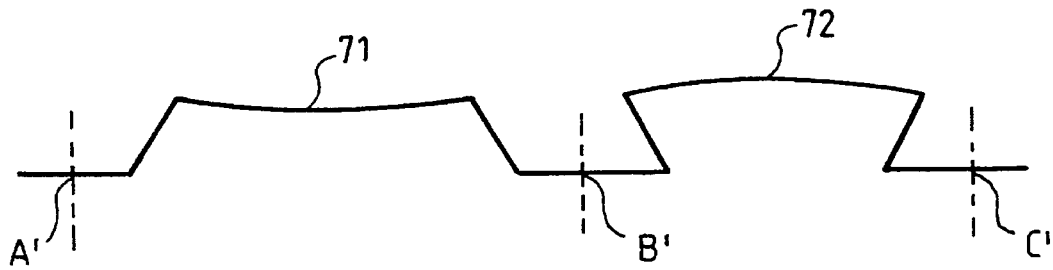

In the case of the two opposite types of strains mentioned with reference to FIG. 2 described here above, a flexible plate having a particular shape may be made according to the combination of shapes illustrated in FIGS. 5b and 5c. This shape is illustrated by FIG. 6 where the plate is fastened at three fastening points A', B', C' to the mechanical part 1 and brings together a first part 71, corresponding to a prestressing used to measure a stretching stress (a shape shown in FIG. 5b) and a second part 72 corresponding to a prestressing used to measure a compressive stress (a shape shown in FIG. 5c).

Figure 7:
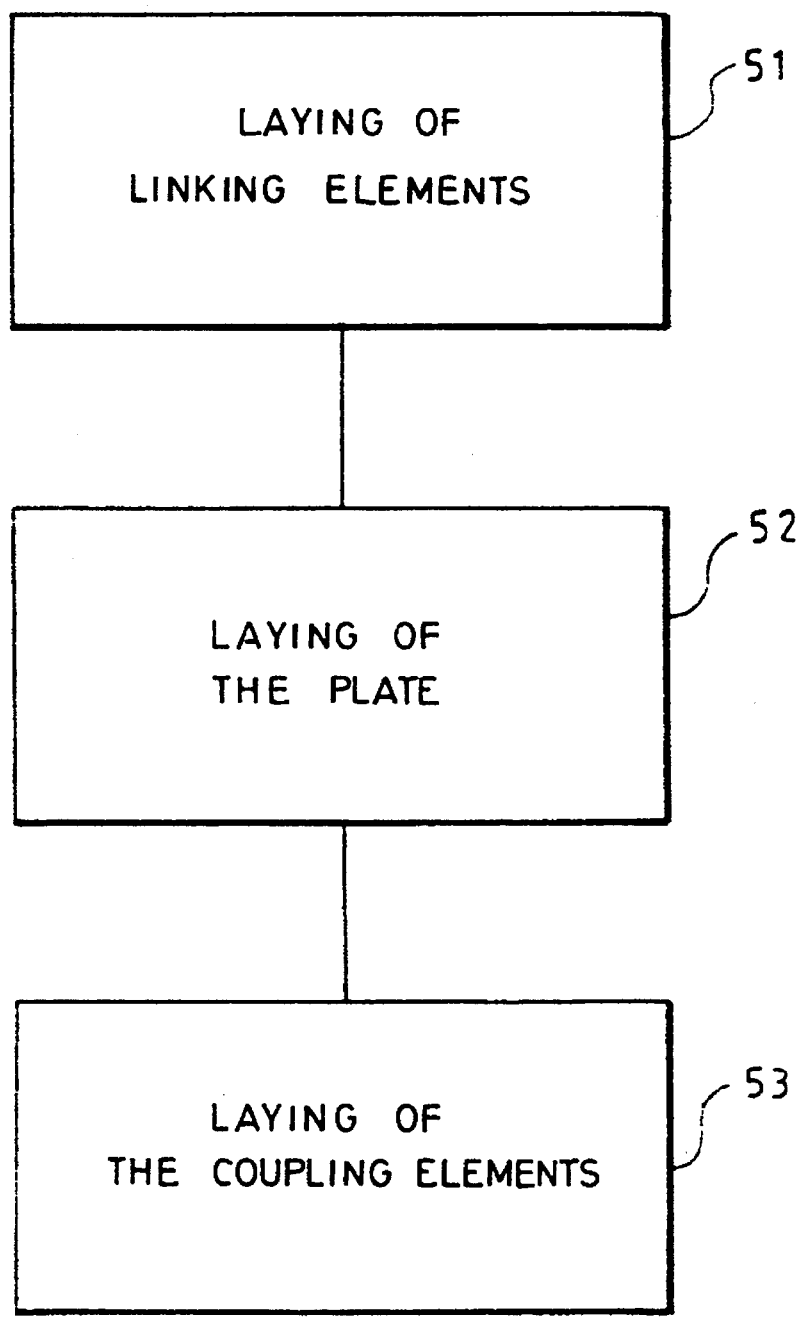
FIG. 7 illustrates a method for the secure fastening of a device according to the invention to a mechanical part to be checked.

The stress measurement device according to the invention may be fixed, for example, to a mechanical part to be checked according to a method comprising three steps illustrated by FIG. 7.

In a first step 51, the linking elements or means are laid on the mechanical part to be checked. These linking means such as screws 5', grooves 11, pins or studs for example are preferably laid out at determined points of the mechanical part. However, owing to the subsequent positioning of the coupling elements, the laying of the linking elements does not call for any particular precision.

In a second step 52, the plate 2 is laid on the linking elements, preferably without any application of forces or moments likely to lead to a laying prestress.

The laying of the coupling means or elements takes place in a third step 53, the definitive fixed joining of the plate and of the linking elements being obtained by the positioning of the coupling elements. If the coupling elements are constituted by bonder or adhesive notably, this bonder may be applied before or after the laying of the plate. In the latter case, the bonder may be in the form of a bulb that is pierced during the positioning of the plate for example. This bonder may have one or two constituents depending on the state of the surfaces to be coupled. The coupling means may also be constituted, for example, by a solder. In this case, the soldering material may take the form of pellets and may be melted by various means known to those skilled in the art, these pellets being possibly made of plastic or tin for example.

What is claimed is:

1. A method for fastening a device on a mechanical part which measures stresses exerted on the mechanical part, the method comprising the steps of:

laying linking means on the mechanical part such that a portion of the linking means extends above a surface of said mechanical part;

laying a plate on the linking means such that the plate is spaced from the surface of the mechanical part by a distance which substantially corresponds to said portion of the linking means;

laying a coupling means on said linking means and said plate to join the plate and the linking means; and fastening a strain gauge on said plate which generates an electrical signal representing stresses exerted;

wherein the coupling means are constituted by a bonder packaged in at least one bulb before the laying of the coupling means, the bulb being fixed to a face of the plate that is directed towards the mechanical part and being pierced during the laying of the plate on the linking means.

2. A device for the measurement of stresses exerted on a mechanical part, said device comprising:

at least one plate;

linking and coupling means for connecting said at least one plate to the mechanical part; and at least one strain gauge fastened to said at least one plate for generating an electrical signal representing stresses exerted;

wherein:

said at least one plate comprises a band of flexible material which is folded along four lines to form an upper part connected by sides with two lower parts which are fixed to the mechanical part, and the plate is applied to the mechanical part with a laying prestress.

3. A device according to claim 2, wherein at least two linking points connect the plate to the mechanical part.

4. A device according to claim 2, wherein means for the shaping of the electrical signal are laid out on the plate.

5. A device according to claim 4, wherein the shaping means deliver a frequency signal.

6. A device according to claim 2, wherein the coupling means comprises a bonder.

7. A device according to claim 2, wherein the coupling means comprises a solder.

8. A device according to claim 2, wherein the device is covered with a protective coating.

9. A device according to claim 2, wherein said plate is applied to the mechanical part with said laying prestress so that lower parts of said plate form a predetermined angle with respect to sides of the plate.

10. A device according to claim 2, wherein, when the mechanical part has undergone a stretching strain or a compressive strain, the at least one strain gauge fastened to the plate measures at least one surface strain from among the following: upper longitudinal strain, lower longitudinal strain, upper transversal strain and lower transversal strain, these surface strains being induced by a strain undergone by the mechanical part.

11. A device for measuring stresses exerted on a mechanical part, said device comprising:

at least one plate;

linking and coupling means for connecting said at least one plate to the mechanical part; and at least one strain gauge fastened to said at least one plate for generating an electrical signal representing stresses;

wherein said at least one plate comprises a band of flexible material and the coupling means comprises a solder.

12. A device for measuring stress on a mechanical part, said device comprising:

at least one plate connecting means for connecting said at least one plate to the mechanical part, said connecting means being inserted in said mechanical part and having a top portion which extends above a surface of the mechanical part, said at least one plate comprising guide portions and being laid on top of said top portion of said connecting means so that said guide portions are fitted and fastened on said top portion of said connecting means which extends above the surface of the mechanical part, such that said at least one plate is spaced from the surface of the mechanical part by a distance which substantially corresponds to said top portion of said connecting means which extends above the surface of the mechanical part; and at least one strain gauge which is fastened to said at least one plate for generating an electrical signal representing stresses.

13. A device according to claim 12, wherein said connecting means comprise screws.

14. A device according to claim 12, wherein said at least one plate is fastened to said connecting means by an adhesive.

15. A device for measuring stresses on a mechanical part, said device comprising:

at least one plate comprising walls which are fitted and fastened to corresponding grooves in the mechanical part by an adhesive, such that said at least one plate is spaced from a surface of the mechanical part by a distance which substantially corresponds to a portion of said wall which extends about said groove and the surface of the mechanical part; and at least one strain gauge which is fastened to said at least one plate for generating an electrical signal representing stresses.

16. A method for fastening a device on a mechanical part which measures stresses exerted on the mechanical part, the method comprising the steps of:

laying linking means on the mechanical part such that a portion of the linking means extends above a surface of said mechanical part;

laying a plate on the linking means such that the plate is spaced is spaced from the surface of the mechanical part by a distance which substantially corresponds to said portion of the linking means;

laying a coupling means on said linking means and said plate to join the plate and the linking means; and fastening a strain gauge on said plate which generates an electrical signal representing stresses exerted;

wherein the coupling means are constituted by a screwing, or a welding or a clinching process.

* * * * *